US009258249B2

(12) United States Patent
Hsieh et al.

(10) Patent No.: US 9,258,249 B2
(45) Date of Patent: Feb. 9, 2016

(54) RESOURCE ACCESS THROTTLING

(75) Inventors: Anderthan Hsieh, Bellevue, WA (US);
James W. Chapman, Bothell, WA (US);
Fuyau Lin, Woodinville, WA (US);
Michael C. Strate, Sea Tac, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 13/372,259

(22) Filed: Feb. 13, 2012

(65) Prior Publication Data

US 2013/0212270 A1    Aug. 15, 2013

(51) Int. Cl.
*G06F 15/16* (2006.01)
*H04L 12/911* (2013.01)
*H04L 29/08* (2006.01)
*H04L 29/06* (2006.01)

(52) U.S. Cl.
CPC ............... *H04L 47/72* (2013.01); *H04L 67/32* (2013.01); *H04L 63/10* (2013.01); *H04L 67/325* (2013.01)

(58) Field of Classification Search
CPC ....................................... H04L 63/10
USPC ............................................ 709/225
See application file for complete search history.

(56) References Cited

U.S. PATENT DOCUMENTS

| 6,189,033 | B1 | 2/2001 | Jin et al. |
| 6,360,254 | B1 | 3/2002 | Linden et al. |
| 7,426,642 | B2 | 9/2008 | Aupperle et al. |
| 2003/0100320 | A1 | 5/2003 | Ranjan |
| 2004/0107114 | A1 | 6/2004 | Curtis |
| 2007/0058662 | A1* | 3/2007 | Yoshikawa .................... 370/447 |
| 2009/0177544 | A1 | 7/2009 | Sugahara |
| 2010/0082912 | A1* | 4/2010 | Lesartre et al. ............... 711/154 |
| 2010/0226346 | A1* | 9/2010 | Caldwell et al. .............. 370/338 |
| 2010/0277276 | A1* | 11/2010 | Bayne et al. .................. 340/5.21 |
| 2010/0294833 | A1 | 11/2010 | Silverbrook et al. |
| 2011/0093939 | A1* | 4/2011 | Barbour et al. ..................... 726/7 |
| 2011/0107436 | A1* | 5/2011 | Cholas et al. .................... 726/29 |
| 2011/0122694 | A1* | 5/2011 | Modave et al. .......... 365/185.04 |
| 2011/0167039 | A1* | 7/2011 | Kol et al. ........................ 707/633 |
| 2012/0030736 | A1* | 2/2012 | Resch et al. ....................... 726/5 |
| 2012/0079567 | A1* | 3/2012 | Van De Groenendaal ........ 726/4 |
| 2012/0115436 | A1* | 5/2012 | Dai et al. ........................ 455/410 |
| 2012/0144203 | A1* | 6/2012 | Albisu ........................... 713/184 |
| 2012/0254949 | A1* | 10/2012 | Mikkonen et al. ................. 726/4 |
| 2012/0317565 | A1* | 12/2012 | Carrara et al. ................ 717/178 |
| 2012/0317638 | A1* | 12/2012 | Carrara et al. .................. 726/17 |

(Continued)

OTHER PUBLICATIONS

Sheriff, Paul D., "Single Sign-On Enterprise Security for Web Applications", Retrieved at <<http://msdn.microsoft.com/en-us/library/ms972971.aspx>>, Feb. 2004, pp. 26.

*Primary Examiner* — Hamza Algibhah
(74) *Attorney, Agent, or Firm* — Aneesh Mehta; Kate Drakos; Micky Minhas

(57) ABSTRACT

Techniques for resource access throttling are described. In implementations, access to a network resource can be controlled based on a variety of factors, such as a type of user requesting access to the network resource. For example, consider a scenario where an online content store is preparing to launch. To prevent resources associated with the online content store from being overwhelmed by the number of requests for access when the store is launched, techniques can be implemented to throttle the number of requests that are granted. For instance, requests for access can be throttled based on different user types.

20 Claims, 6 Drawing Sheets

(56) References Cited

U.S. PATENT DOCUMENTS

| | | | |
|---|---|---|---|
| 2013/0051331 A1* | 2/2013 | Bao et al. | 370/329 |
| 2013/0078925 A1* | 3/2013 | Aguirre et al. | 455/62 |
| 2013/0111554 A1* | 5/2013 | Sposato et al. | 726/4 |
| 2013/0159195 A1* | 6/2013 | Kirillin et al. | 705/71 |

* cited by examiner

RESOURCE ACCESS THROTTLING

BACKGROUND

Today's online environment enables a vast number of users to access network resources. Examples of such network resources include websites, shopping sites, social networking sites, content distribution sites, and so on. One consequence of this vast number of users is that a popular network resource can receive a tremendous amount of traffic over a short period time. Such increased traffic can strain the ability of a network resource to satisfy access requests.

For example, consider a scenario where a new shopping website is being launched. If a number of requests to access the new shopping website exceeds the ability of the shopping website to process and/or satisfy the requests, some or all of the requests may fail. Further, resources associated with the shopping website (e.g., network resources) may also fail.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for resource access throttling are described. In implementations, access to a network resource can be controlled based on a variety of factors, such as a type of user requesting access to the network resource. For example, consider a scenario where an online content store is preparing to launch. To prevent resources associated with the online content store from being overwhelmed by the number of requests for access when the store is launched, techniques can be implemented to throttle the number of requests that are granted. For instance, requests for access can be throttled based on different user types.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
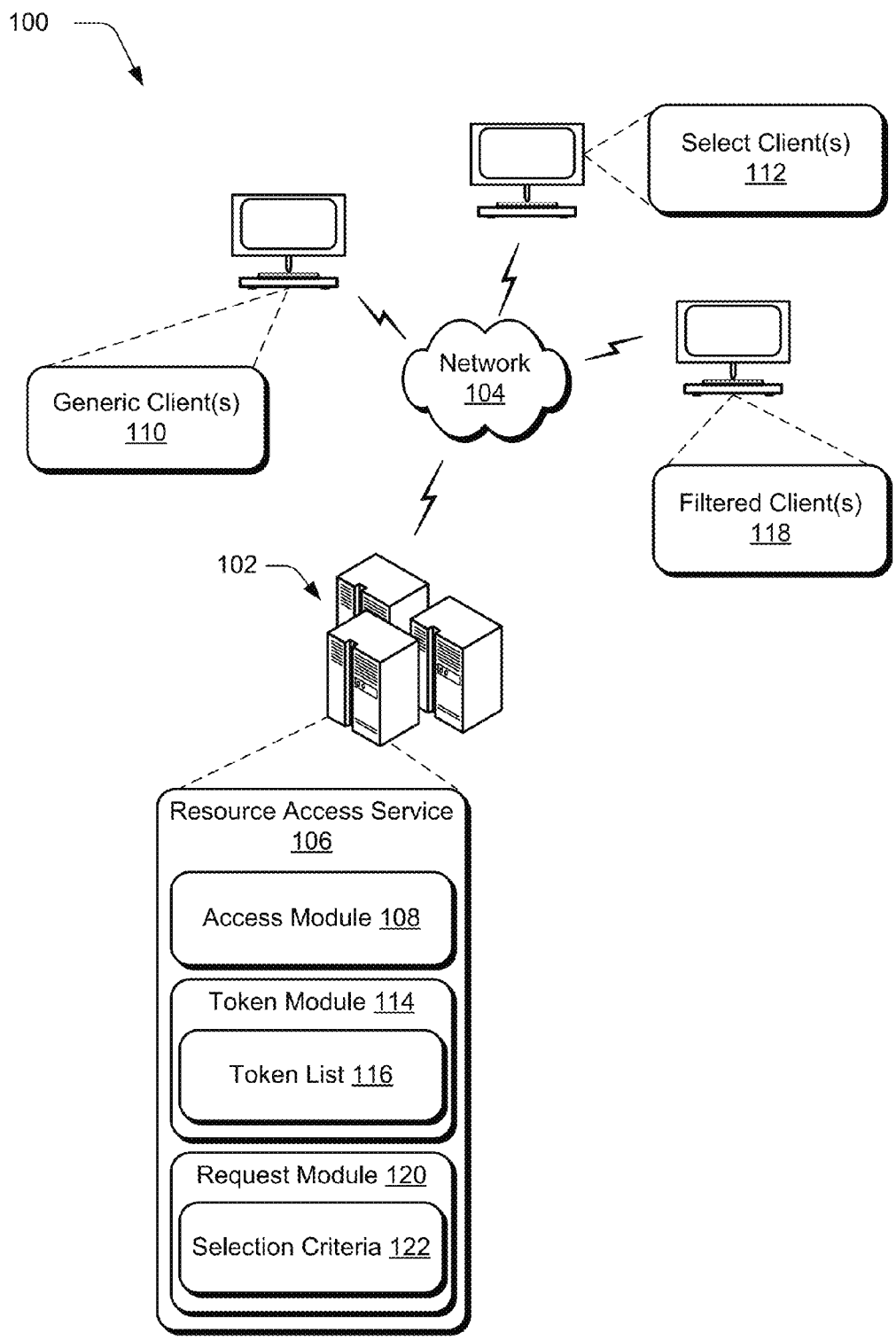
FIG. 1 is an illustration of an environment in an example implementation that is operable to employ techniques discussed herein.

Techniques for resource access throttling are described. In implementations, access to a network resource can be controlled based on a variety of factors, such as a type of user requesting access to the network resource. For example, consider a scenario where an online content store is preparing to launch. To prevent resources associated with the online content store from being overwhelmed by the number of requests for access when the store is launched, techniques can be implemented to throttle the number of requests that are granted. For instance, requests for access can be throttled based on different user types.

In implementations, one user type that is specified is a "generic" user, which can refer to a user that requests access to a network resource via one or more standard network access mechanisms. For example, with reference to the online content store discussed above, a generic user can request access to the online content store by entering a web address (e.g., a uniform resource locator (URL)) for the online content store into a web browser. Techniques discussed herein can determine whether to grant the generic user permission to access the online content store by receiving an identifier for the generic user, e.g., a device identifier. The identifier can be processed to determine if the generic user is within a threshold number of generic users that are permitted to access the online content store. In implementations, the threshold number can be adjusted (e.g., up or down) to control the number of generic users that are permitted to access a particular network resource during a particular time period.

Another type of user that can be specified is a "select" user, which refers to a user which can be given priority access to a network resource. For example, a select user can be provided with an access token that enables the select user to access the network resource. In implementations, when a select user has been granted access to a network resource using an access token, the select user can be issued an "access pass" that enables the select user to obtain subsequent access to the network resource. Access tokens can be tracked such that a particular access token expires after it is used one time to gain access to a network resource.

As yet another type of user that can be specified is a "filtered" user, which refers to a user that can apply for access to a network resource. As part of applying for access, a filtered user can provide various information about the filtered user. For example, with reference to the online content store referenced above, the filtered user can be a content developer that can submit content to the online content store for review and possible sale. The content developer can provide information to the online content store as part of applying to submit content to the online content store. Examples of such information can include an identifier for the content developer, a type of content that the content developer produces, a market and/or markets which the content developer targets, and so on. The information about the content developer can be compared to selection criteria for the online content store. If the information meets one or more of the selection criteria, the content developer may be granted permission to submit content to the online content store. Otherwise, the content developer may be denied such permission.

In the following discussion, an example environment is first described that is operable to employ techniques for providing resource access throttling described herein. Example procedures involving techniques for providing resource access throttling are then described which may be employed in the example environment as well as in other environments. Accordingly, the example environments are not limited to performing the example procedures. Likewise, the example procedures are not limited to implementation in the example environment. Finally, an example system and device are described that are operable to employ techniques discussed herein in accordance with one or more embodiments.

Example Environment

FIG. 1 is an illustration of an environment 100 in an example implementation that is operable to employ techniques for resource access throttling. Environment 100 includes at least one network resource 102, which is representative of a resource which may be accessed via a network 104. For example, the network resource 102 can include a website, a content service, a server (e.g., a Web server), a cloud computing resource, and so on. In embodiments, the network resource 102 can be implemented via various types and/or combinations of computing devices, examples of which are discussed below with reference to FIG. 6. The network 104 may assume a wide variety of different configurations, such as the Internet, a wide area network (WAN), a local area network (LAN), a wireless network, a public telephone network, an intranet, and so on. Further, although a single network 104 is shown, the network 104 may be configured to include multiple networks.

The network resource 102 includes and/or makes use of a resource access service 106, which is representative of functionality to control access to the network resource 102. As part of the resource access service 106 is an access module 108, which is representative of functionality to manage and/or enforce access policies associated with the resource access service 106. For example, the access module 108 can be employed to enable the resource access service 106 to control access to the network resource 102 based on a type and/or attributes of a particular user.

The environment 100 further includes at least one generic client 110, which is representative of one or more users and/or devices that may request access to the network resource 102. For example, a user may request access to the network resource 102 via the generic client 110, such as by selecting a hyperlink associated with the network resource 102, entering a network address (e.g., a uniform resource locator (URL)) for the network resource, and so forth. The resource access module 108 can receive the request for access from the generic client 110, and can decide whether to allow the generic client 110 to access the network resource 102 based on one or more access policies.

For example, a particular access policy can control access to the network resource 102 by applying a "throttling value" to requests for access to the network resource 102. In implementations, a throttling value can be used to establish a threshold limit on the number and/or percentage of devices that are permitted to access a particular resource at a given time. For instance, if the generic client 110 is determined to be within a throttling value, the generic client 110 may be permitted to access the network resource 102. If the generic client 110 is outside of the throttling value, however, the generic client 110 may be denied access to the network resource 102.

In implementations, a throttling value can be increased or decreased to control access to a resource based on a particular set of circumstances. For example, when a particular resource is first launched (e.g., is initially available for access online), the throttling value may be relatively low to prevent a number of requests for access to the resource from overwhelming the ability of the resource to process the requests. As time passes after the initial launch, however, the throttling value can be raised (e.g., incrementally over time) to allow an increasing number of devices to access the resource. Example ways of determining and applying throttling values are discussed in more detail below.

Further included in the environment 100 is at least one select client 112, which is representative of one or more users and/or devices that can be given priority access to the network resource 102. For example, the select client 112 can be provided with a token (e.g., an access token) that enables priority access to the network resource 102. The resource access service 106 further includes a token module 114, which is representative of functionality to generate and/or manage tokens for the resource access service 106.

In an example implementation, the select client 112 can be provided with a uniform resource identifier (URI) that identifies the network resource 102 and that includes a token that may be used to access the network resource 102. For example, the access module 108 can retrieve a token from the token module 114 and can generate a URI that includes the token. One example of such a URI can be "networkresource102: Launch?token=abc123." Thus, in this particular example, the token would be "abc123."

Further to this example, the URI can be provided to the select client 112 using any suitable technique, such as communicating the URI from the resource access service 106 to the select client 112. The select client 112 can use the URI to request access to the network resource 102, such as via a web browser executing on the select client 112. In response to the request to access the network resource 102, the request can be routed to the resource access service 106. For example, the network resource 102 can be in an access throttling mode that can cause requests to access the network resource 102 to be routed to the resource access service 106.

Continuing with the example, the access module 108 can receive the URI and can ascertain that the URI includes a token. The access module 108 can then submit the token to the token module 114, which can compare the token with a token list 116 to determine if the token is valid. In implementations, the token module 114 employs the token list 116 to track tokens that have been issued, e.g., as part of URIs that are provided to clients and/or users. The token module 114 can also use the token list 116 to track tokens that have been submitted as part of a request to access the network resource 102.

Further to the ongoing example, if the token module 114 determines that the token submitted by the select client 112 is valid, the access module 108 can enable the select client 112 to access the network resource 102. In implementations, a "valid" token can refer to a token that is listed in the token list 116 as having been issued by the token module 114, and that has not previously been received as part of a request to access the network resource 102. Thus, in embodiments a token may be used one time to access a resource such that a subsequent attempt to access the resource that includes the token may fail. This can enable a URI and/or other link that includes the token from being reused multiple times to enable access to a resource.

Once the select client 112 has been granted initial access to the network resource 102 using a token, the select client 112 can be provided (e.g., by the access module 108) with an "access pass" that enables subsequent access to the network resource 102. For example, the access pass can be a special code that can be recognized by the access module 108 as allowing access to the network resource 102. Examples of the access pass can include a hash of an identifier for a device (e.g., of a media access control (MAC) address of the select client 112), a cookie (e.g., a hypertext transfer protocol (HTTP) cookie), a code that is randomly generated by the access module 108, and so on. In implementations that use a hashed identifier, hash keys that map to particular identifiers for devices can be unique per machine. Thus, after the select client 112 has initially been granted access to the network resource 102 and provided with an access pass, the select client 112 can cache the access pass locally. The select client 112 can use the access pass as part of subsequent requests to access the network resource 102.

In at least some implementations, techniques can ascertain when a particular user submits a particular token as part of a request for access to a resource. With reference to the example above, the token module 114 can mark the token submitted by the select client 112 as having been used, and can associate a client identifier for the select client 112 with the token. Thus, the resource access service 106 can determine which client device and/or user submitted which token.

Further included in the environment 100 is at least one filtered client 118, which is representative of one or more users and/or devices that can apply for access to the network resource 102. For example, the filtered client 118 can go through an application process that can enable the resource access service 106 to determine whether the filtered client 118 is to be granted access to the network resource 102. As part of the application process, information about the filtered client 118 can be provided to the resource access service 106. For example, the filtered client 118 can submit one or more forms to the resource access service 106 that include information about the filtered client 118. Examples of such forms can include a web form hosted by the resource access service 106, an electronic document (e.g., an electronic form) that can be configured with information and submitted by the filtered client 118 to the resource access service 106, and so on.

Further included as part of the resource access service 106 is a request module 120, which is representative of functionality to receive and process requests for access to the network resource 102. For example, the request module 120 can receive a request for access to the network resource 102 from the filtered client 118. The request module 120 can determine information about the filtered client 118 from the request, and can compare the information to one or more selection criteria 122 to determine whether the filtered client 118 is to be allowed access to the network resource 102.

The selection criteria 122 are representative of various criteria that can be employed to determine whether particular users and/or devices are to be granted access to the network resource 102. For example, if a particular user meets a threshold number of the selection criteria 122, a particular user may be granted access to the network resource 102. However, another user that does not meet the threshold number of the selection criteria 122 may be denied access to the network resource 102.

As an example implementation, consider a scenario where the network resource 102 is a content store that offers content to various users. Examples of such content can include audio content, video content, e-books, applications, and so on. Further to the example scenario, the filtered client 118 is associated with an application developer that wishes to submit an application (e.g., a software application) to the network resource 102 such that the application can be reviewed and potentially offered for sale by the network resource 102 to other users. The filtered client 118 applies with the resource access service 106 to request permission to submit the application to the network resource 102.

As part of applying with the resource access service 106, various information about the filtered client 118 is provided to the request module 120. For example, information about the filtered client 118 can be entered into a form, which can be submitted to the request module 120. Examples of such information can include an identifier for the filtered client 118 (e.g., a name), contact information, a location (e.g., a business address, a geographical region in which the filtered client 118 does business, and so on), a market or markets to which the application developed by the filtered client 118 is targeted, an application type for the application, and so on. With respect to the target markets referenced above, this can refer to a language and/or geographical region to which the application is targeted. For example, a particular application can be written for release in a number of different languages, such as Mandarin, English, Japanese, German, and so on. Thus, a particular application developer can develop an application for a particular language and/or geopolitical region.

Further to the example scenario, the request module 120 compares the information about the filtered client 118 to the selection criteria 122. Examples of the selection criteria 122 include markets to which the network resource 102 wishes to offer applications. For example, the network resource 102 can set a threshold total number of application developers that it will permit to submit applications for review and/or sale via the network resource 102, e.g., 1000 developers. Further, the network resource 102 can allocate portions of the threshold number of application developers to application developers for different markets.

For example, the network resource 102 can determine that certain markets have a higher demand for applications than other markets, that some markets are underrepresented with respect to the availability of applications targeted towards those markets, and so on. To meet the determined goals for market representation, the network resource 102 can configure the selection criteria 122 to allocate a percentage of the threshold number of developers to developers for one market, a different percentage of the threshold to developers for another market, and so on. For instance, the selection criteria 122 can allocate 35% of the threshold to application developers that develop applications Mandarin, 30% to application developers that develop applications in English, 20% to application developers that develop applications in German, and so on. Alternatively or additionally, the selection criteria 122 can allocate specific numbers of applications to particular markets.

The selection criteria 122 can include a variety of other criteria, such as types of applications (e.g., games, educational, enterprise, and so on), diversity status, a number of applications that a developer has available to submit, and so on.

Continuing with the example scenario, if the request module 120 determines that the filtered client 118 satisfies one or more of the selection criteria 122 that have not been previously fulfilled, the request module 120 can grant the filtered client 118 permission to submit an application to the network resource 102 for review. For example, the request module 120 can determine that an application developed by the filtered client 118 is targeted to a market whose allocation of the threshold number of application developers has not yet been fulfilled. Further, in response to a successful registration of the filtered client 118 to submit an application to the network resource 102, one or more of the selection criteria 122 can be adjusted to account for the registration. For example, the filtered client 118 can develop an application that is targeted towards a particular market. Thus, one of the selection criteria 122 that allocates a specific number of application developers to the particular market can be incremented to indicate that at least a portion of the allocation to the particular market has been satisfied. In implementations, when an allocation associated with a particular one of the selection criteria 122 has been fulfilled, that particular selection criteria may be withdrawn from consideration when determining whether to allow a particular entity to access the network resource 102.

In implementations, the selection criteria 122 can be time-sensitive such that one or more of the selection criteria are configured to be applied over a particular period of time. For example, with reference to the content store example discussed above, the selection criteria 122 can be configured to be applied when the content store goes live and is available to accept requests for access. Further, the selection criteria 122 can be applied for a particular period of time after the content store goes live, e.g., one month. After that period of time expires, one or more of the selection criteria 122 can also expire such that they are no longer considered in determining whether to allow a developer or other entity to submit content review and/or sale via the content store.

Having described an example environment in which the techniques described herein may operate, consider now a discussion of some example procedures in accordance with one or more embodiments.

Example Procedures

The following discussion describes example procedures for resource access throttling in accordance with one or more embodiments. In portions of the following discussion, reference will be made to the environment 100 of FIG. 1.

Figure 2:
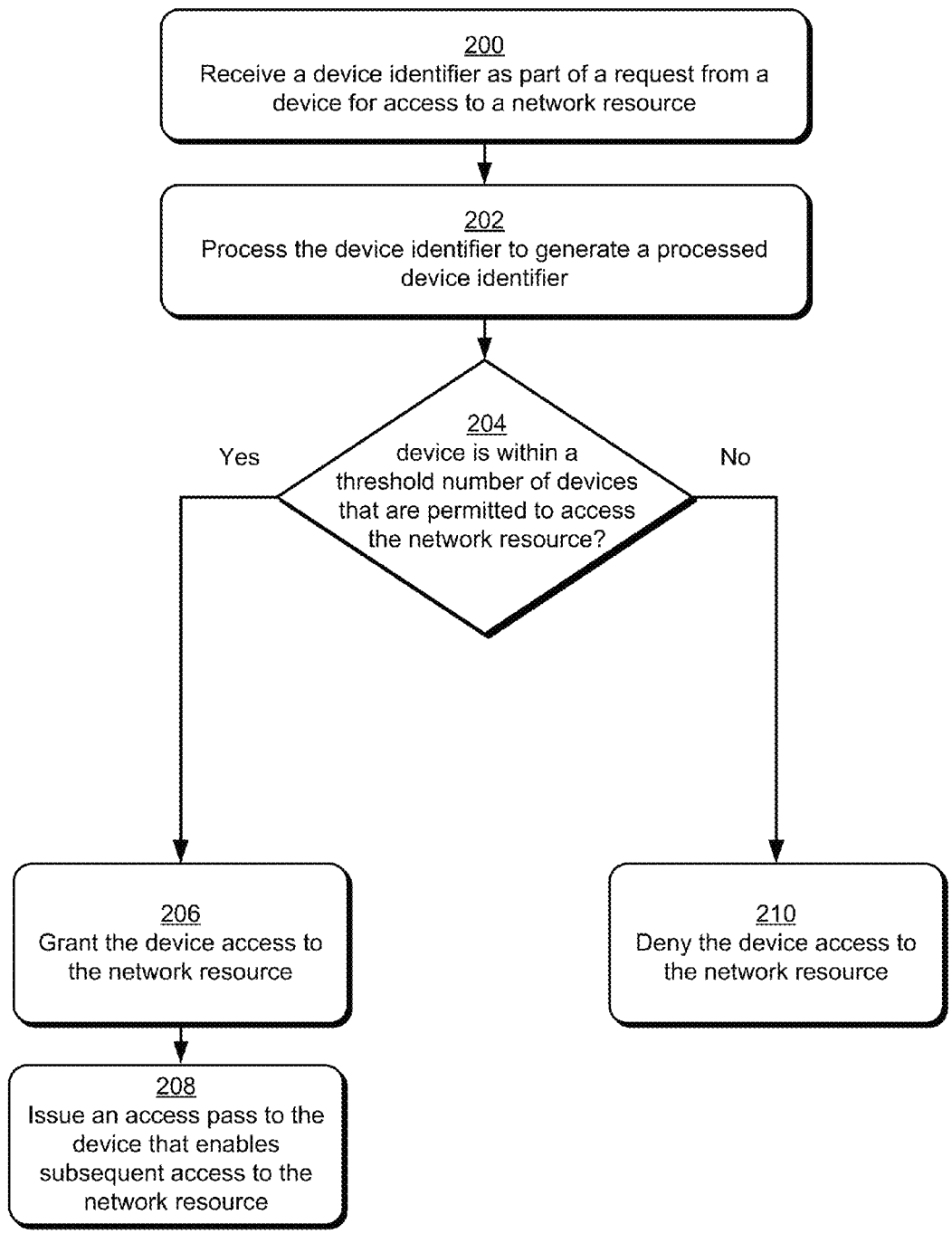
FIG. 2 is a flow diagram that describes steps in a method in accordance with one or more embodiments.

FIG. 2 is a flow diagram that describes steps in a method in accordance with one or more embodiments. With reference to the environment 100, the method describes an example way of determining whether the generic client 110 is permitted to access the network resource 102.

Step 200 receives a device identifier as part of a request from a device for access to a network resource. For example, the resource access service 106 can receive a request from the generic client 110 for access to the network resource 102. The request can include an identifier for the generic client 110, such as a MAC address for the generic client and/or any other suitable identifier that can be used to identify the generic client.

Step 202 processes the device identifier to generate a processed device identifier. For example, one or more algorithms can be applied to the device identifier to generate the processed device identifier. An example of one such algorithm is discussed below with reference to FIG. 3. Step 204 determines, based on the processed device identifier, whether the device is within a threshold number of devices that are permitted to access the network resource. For example, as referenced above and discussed in more detail below, the access module 108 can determine whether the processed device identifier is within access throttling settings for the network resource 102.

If the processed device identifier is within the threshold number of devices ("Yes"), step 206 grants the device access to the network resource. For example, if a processed identifier for the generic client 110 is within a throttling value for the network resource 102, the generic client 110 can be granted access to the network resource 102. Step 208 issues an access pass to the device that enables subsequent access to the network resource. For example, if the device subsequently requests access to the network resource (e.g., at a later date), the device can provide the access pass. If the access pass is valid (e.g., not expired or revoked), the device can be granted access to the network resource. Examples of an access pass are discussed above.

In implementations, an access pass can expire after a particular period of time. For example, an access pass and/or set of access passes can be issued with an expiration date. On and/or after the expiration date, the access pass will no longer be effective to enable access to a network resource. Alternatively or additionally, an access pass can be revoked (e.g., by the resource access service 106) such that if the access pass is presented as part of a request to access a resource, the request will be denied. In implementations, if a device's access pass expires or is revoked, the device may repeat the process described above to determine if the device is permitted to access a particular resource.

Returning to step 204, if the processed device identifier is not within the threshold number of devices ("No"), step 210 denies the device access to the network resource. For example, if a processed identifier for the generic client 110 is not within a throttling value for the network resource 102, the generic client 110 can be denied access to the network resource 102.

In implementations, since the device identifier referenced above can be based on attributes of the device (e.g., a MAC address, device configuration settings, and so on), the device identifier can be static for a particular device. Thus, if a particular device submits more than one request for access to a network resource, each of the requests can include the same device identifier. Further, processing the device identifier in response to each of the requests can produce identical processed device identifiers. Accordingly, the result of each of the requests (e.g., access granted or access denied) can be the same.

Figure 3:
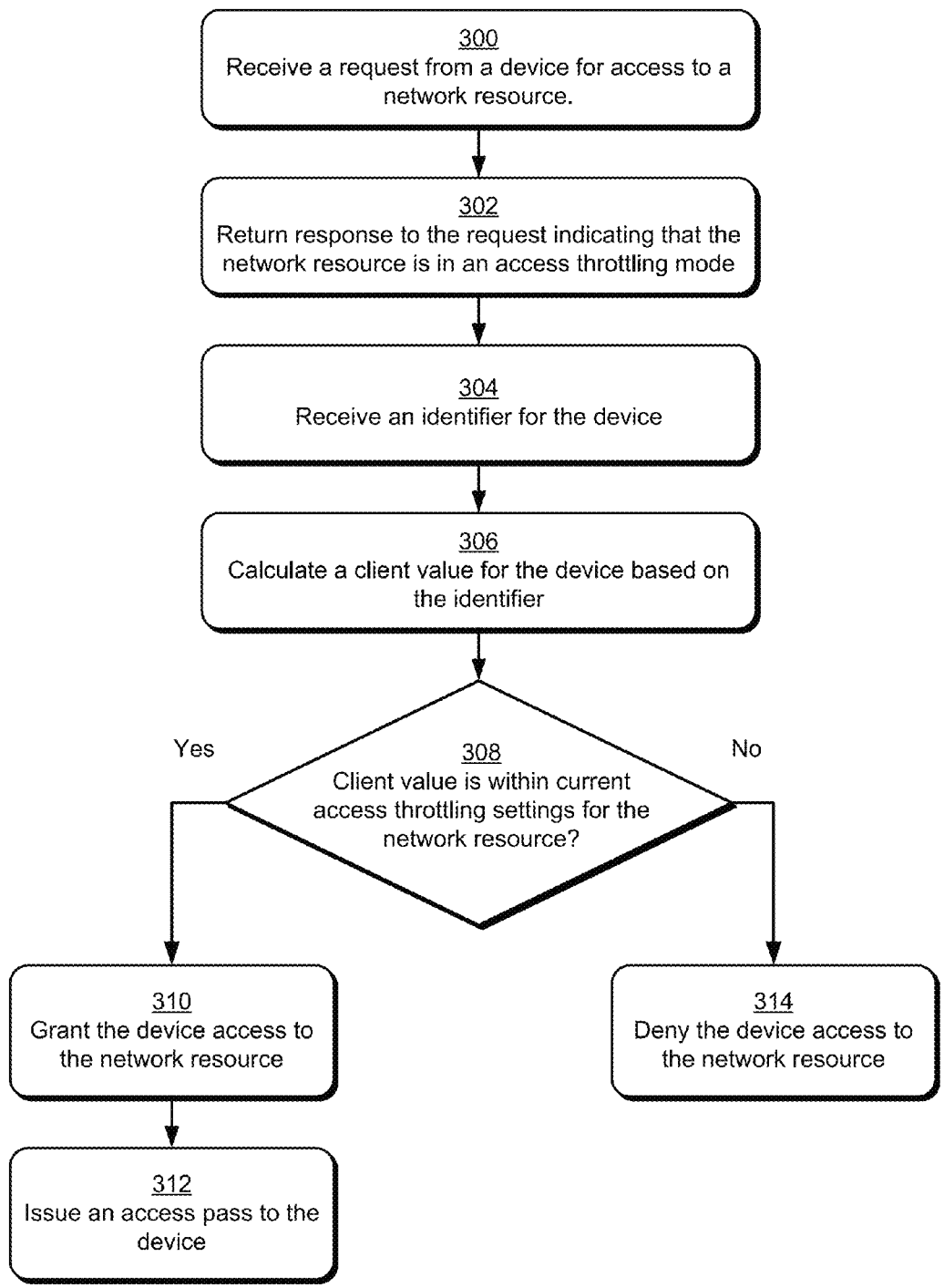
FIG. 3 is a flow diagram that describes steps in a method in accordance with one or more embodiments.

FIG. 3 is a flow diagram that describes steps in a method in accordance with one or more embodiments. In implementations, the method describes a detailed way of performing the method described above with reference to FIG. 2.

Step 300 receives a request from a device for access to a network resource. For example, the resource access service 106 can receive the request in response to the generic client 110 attempting to navigate to the network resource 102 using a network address (e.g., a URL) for the network resource. Step 302 returns a response to the request indicating that the network resource is in an access throttling mode. For example, the resource access service 106 can return an HTTP 204 response to the generic client 110, which the generic client 110 can be configured to interpret as the network resource 102 being in an access throttling mode. In implementations, an HTTP 204 response can indicate that the resource access service 106 successfully received and processed the request for access to the network resource 102, but that no content is being returned in response to the request.

Step 304 receives an identifier for the device. For example, the generic client 110 can return identifier to the resource access service 106 in response to the indication that the network resource 102 is in an access throttling mode. Examples of an identifier include a MAC address for the device, a security identifier for the device, and/or any other suitable identifier that can be used to differentiate the device from other devices. In implementations, the identifier can include one or more other identifiers that have been processed by the device. For example, the identifier can be a hash of a MAC address for the device, and/or a hash of multiple combined identifiers for the device.

Step 306 calculates a client value for the device based on the identifier. For example, the access module 108 can apply one or more algorithms to the identifier to determine the client value. As one example, a modulo operation can be performed using the identifier, with the result corresponding to the client value. For instance, a divisor for a modulo operation can be assigned a constant value, such as 100. The identifier for the client can be used as the dividend for the modulo operation. For example, consider an example identifier 7008069711. Using the example modulo operation, the identifier is divided by the constant value 100, with the remainder of this division operation corresponding to the result for the modulo operation. Mathematically, this can be illustrated using the formula 7008069711/100=70080697.11, with the result of the module operation corresponding to the remainder of 11. Thus, the client identifier in this example would be 11.

Step 308 determines whether the client value is within current access throttling settings for the network resource. For example, different access throttling settings can be specified to control a number of devices that can be permitted to access a resource, e.g., at a particular time and/or during a particular time interval. For instance, consider the following pseudo code that specifies access throttling settings in accordance with an example implementation.

```
<RestrictedAccess>
    <Throttling>
        <T dateTime="2012-01-01T13:30:00" clientvalue≤"5" deniedClientCacheInterval="3600" />
        <T dateTime="2012-01-15T08:00:00" clientvalue≤"25" deniedClientCacheInterval="3600" />
        <T dateTime="2012-01-25T08:00:00" clientvalue≤"50" deniedClientCacheInterval="3600" />
        <T dateTime="2012-02-10T00:00:00" clientvalue≤"75" deniedClientCacheInterval="3600" />
        <T dateTime="2012-02-20T00:00:00" clientvalue≤"100" deniedClientCacheInterval="3600" />
    </Throttling>
</RestrictedAccess>
```

As illustrated, the pseudocode includes access throttling settings that are based on various date ranges. For example, the first setting indicates that, starting on the date Jan. 1, 2012 and time 13:30:00, access to the network resource will be throttled to devices whose calculated client value is less than or equal to 5. With reference to the example discussed above where a client value of 11 was calculated, the client would be denied access to the network resource. Further, a second setting indicates that starting on the date Jan. 15, 2012 and time 08:00:00, access to the network resource will be throttled to devices whose calculated client value is less than or equal to 25. Referring again to the example discussed above where a client value of 11 was calculated, the client would be granted access to the network resource. Thus, in this example the access throttling settings are based on date and time, and are escalated to enable increasing numbers of devices to be granted access to the network resource. For example, the final setting indicates that starting on the date Feb. 20, 2012 and time 00:00:00, access to the network resource will be throttled to devices whose calculated client value is less than or equal to 100. Based on the example modulo operation discussed above, a client value less than or equal to 100 would correspond to any device that submitted a valid client value.

If the client value is within current access throttling settings for the network resource ("Yes"), step 310 grants the device access to the network resource. Step 312 issues an access pass to the device. Example ways of implementing and utilizing an access pass are discussed above.

If the client value is not within current access throttling settings for the network resource ("No"), step 314 denies the device access to the network resource.

In implementations, the access throttling mode can be turned off such that requests to access the network resource will be processed without implementing the procedures discussed above with respect to determining if a client falls within current access throttling settings. Thus, in such implementations, successful requests for access to a network resource can be granted without requiring a device to provide an identifier and/or a token. This can conserve resources that are used to implement the access throttling mode, and can increase the speed and/or responsiveness of the network resource.

Figure 4:
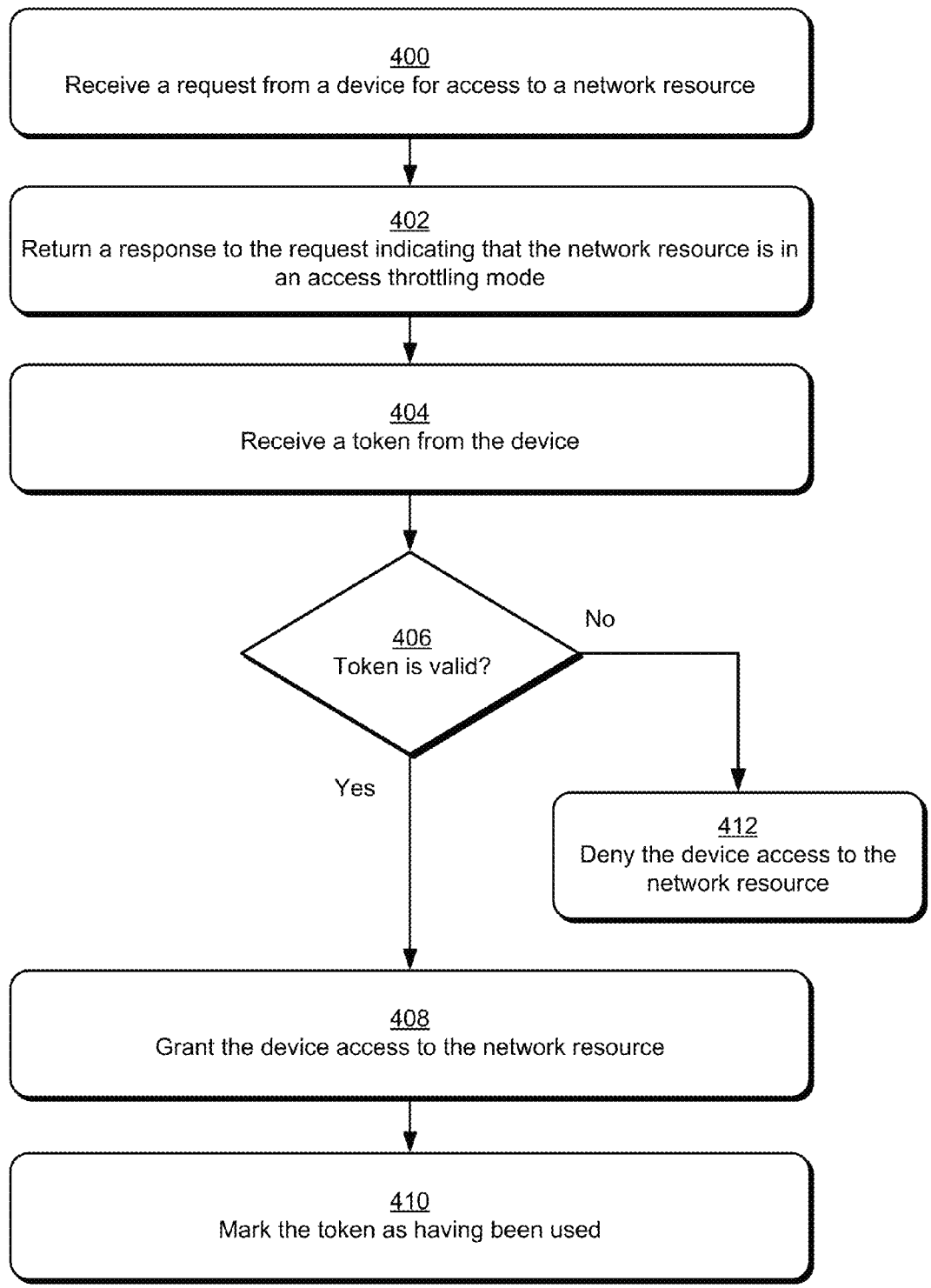
FIG. 4 is a flow diagram that describes steps in a method in accordance with one or more embodiments.

FIG. 4 is a flow diagram that describes steps in a method in accordance with one or more embodiments. With reference to the environment 100, the method describes an example way of enabling the select client 112 to access the network resource 102. In implementations, the select client 112 can be associated with a priority user, such as a software reviewer, a website reviewer, a software tester, an industry publication, and so on.

Step 400 receives a request from a device for access to a network resource. For example, the resource access service 106 can receive a request from the select client 112 for access to the network resource 102. Step 402 returns a response to the request indicating that the network resource is in an access throttling mode. One example of such a response as discussed above with reference to FIG. 3.

Step 404 receives a token from the device. For example, the select client 112 can return the token to the resource access service 106 in response to receiving an indication that the network resource 102 is an access throttling mode. As discussed above, the select client 112 can obtain the token as part of a URI provided to the select client by the resource access service 106.

Step 406 determines whether the token is valid. For example, the token module 114 can determine whether the token is listed in the token list 116. Further, if the token is listed in the token list 116, the token module 114 can determine whether the token is marked as having been used as part of a previous request for access to the network resource 102. Thus, in at least some implementations, a "valid" token refers to the token that has been legitimately issued (e.g., by the token module 114) and that has not been previously provided as part of a request for access to the network resource 102.

If the token is valid, step 408 grants the device access to the network resource. Step 410 marks the token as having been used. For example, the token module 114 can mark the token in the token list 116 as having been used. Thus, a subsequent request for access to the network resource 102 that includes the token may fail since the token is marked as having been used. Step 412 issues an access pass to the device. Example ways of implementing and utilizing an access pass are discussed above.

If the token is not valid, step 414 denies the device access to the network resource. For example, the token module 114 can determine that the token is not identified in the token list 116. Alternatively, the token module 114 can determine that the token is marked in the token list 116 as having been previously used. In either case, the token module 114 can notify the access module 108 as such, which can deny access to the network resource 102 by the particular device. In at least some implementations, an indication of a failed resource request based on an invalid token can be cached, e.g., by the resource access service 106. Thus, a subsequent request that uses the invalid token can be denied based on the cached failure without checking the token against the token list 116.

In implementations, this can conserve various resources that would be used to process the token and check whether the token is valid.

Figure 5:
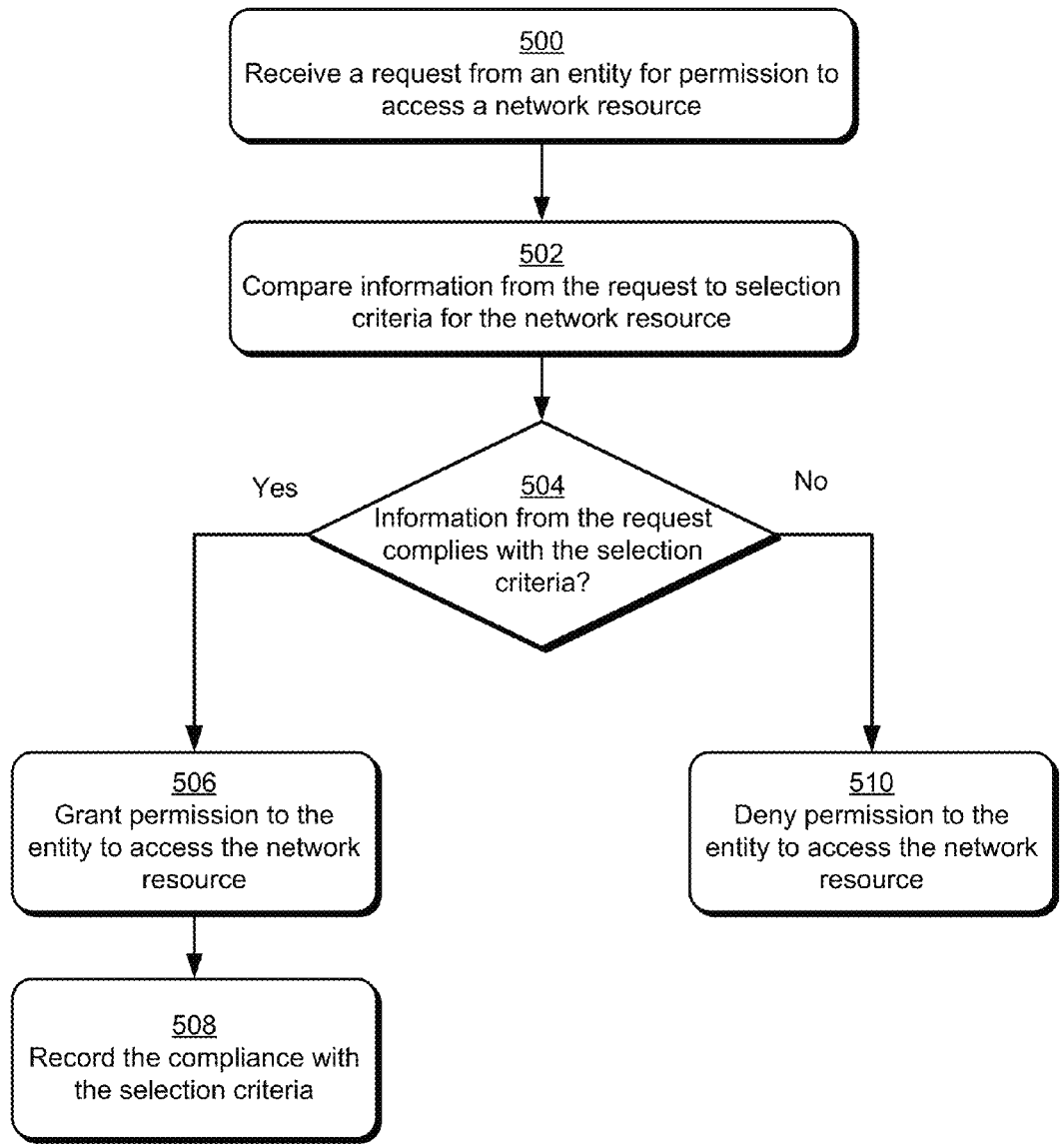
FIG. 5 is a flow diagram that describes steps in a method in accordance with one or more embodiments.

FIG. 5 is a flow diagram that describes steps in a method in accordance with one or more embodiments. With reference to the environment 100, the method describes an example way of determining whether the filtered client 118 is permitted to access the network resource 102.

Step 500 receives a request from an entity for permission to access a network resource. In implementations, the request can be in response to an invitation sent to the filtered client 118 (e.g., from the network resource 102), inviting the filtered client 118 to apply for permission to submit content to the network resource 102. For example, as discussed above, the filtered client 118 can be associated with a content developer that can apply with the resource access service 106 for permission to submit content to the network resource 102. The network resource 102 can be associated with a content service or other entity that can review the content to determine if the content meets one or more content criteria. Examples of such content criteria can include content quality, content type, a market and/or markets to which the content is targeted, and so on. If content meets one or more of the content criteria, the network resource 102 can make the content available to be accessed by users via the network resource 102. For example, the network resource 102 can be configured as a content store that can offer the content for sale.

Step 502 compares information from the request to selection criteria for the network resource. For instance, the request module 120 can identify information about an entity from the request, and can compare the information to the selection criteria 122. Examples of selection criteria are discussed above.

Step 504 determines whether the information from the request complies with the selection criteria. For example, the request module can set a threshold number of the selection criteria 122 that are to be satisfied by a request to submit content to the network resource 102. In implementations, certain of the selection criteria can be weighted such that a particular selection criterion is given a higher priority than others. Thus, a particular request to submit content can be assigned a weighted score based the particular selection criteria that the request complies with. In such embodiments, if a request meets a threshold score, the entity that submits the request can be permitted to submit content to the network resource.

If the information from the request complies with the selection criteria ("Yes"), step 506 grants permission to the entity to access the network resource. For example, the token module 114 can generate a token and provide the token to the access module 108. The access module 108 can provide the token to the filtered client 118. For instance, the access module 108 can embed the token in a URI, which can then be communicated to the filtered client 118, e.g., via an e-mail to the filtered client. The filtered client 118 can use the token to access the network resource 102 and submit content to the network resource. In implementations, the token can be handled at least in part as discussed above with reference to FIG. 4.

Further, in at least some embodiments the filtered client 118 can be issued an access pass which enables subsequent access to the network resource 102. Example ways of implementing and utilizing an access pass are discussed above.

Step 508 records the compliance with the selection criteria. As discussed above, the selection criteria 122 can include a wide variety of different selection criteria. Thus, the information from the request may be found to correspond to a particular subset of the selection criteria. Accordingly, the selection criteria included as part of the subset can be marked to indicate that an entity that complies with the subset has been granted permission to submit content to the network resource 102. In implementations, this can enable the request module 120 to track which of the selection criteria 122 have been met.

For example, if a particular selection criterion reaches a threshold level of compliance (e.g., a number of granted requests that comply with the criterion), the particular selection criterion can be withdrawn from consideration when considering further requests for permission to submit content. Alternatively or additionally, a weight associated with the particular search criterion may be reduced with respect to the weight that the particular search criterion contributes to an overall weighted score for a request under consideration.

Returning to step 504, if the information from the request does not comply with the selection criteria ("No"), step 510 denies permission to the entity to access the network resource. For example, the access module 108 can notify the filtered client 118 that the filtered client was not selected to submit content to the network resource 102 at this time. Access module 108 can further notify the filtered client 118 that the resource access service 106 is currently throttling the number of entities that it permits to submit content to the network resource 102, and that the filtered client 118 may reapply for permission to submit content at a later date.

Having discussed some example procedures, consider now a discussion of an example system and device in accordance with one or more embodiments.

Example System and Device

Figure 6:
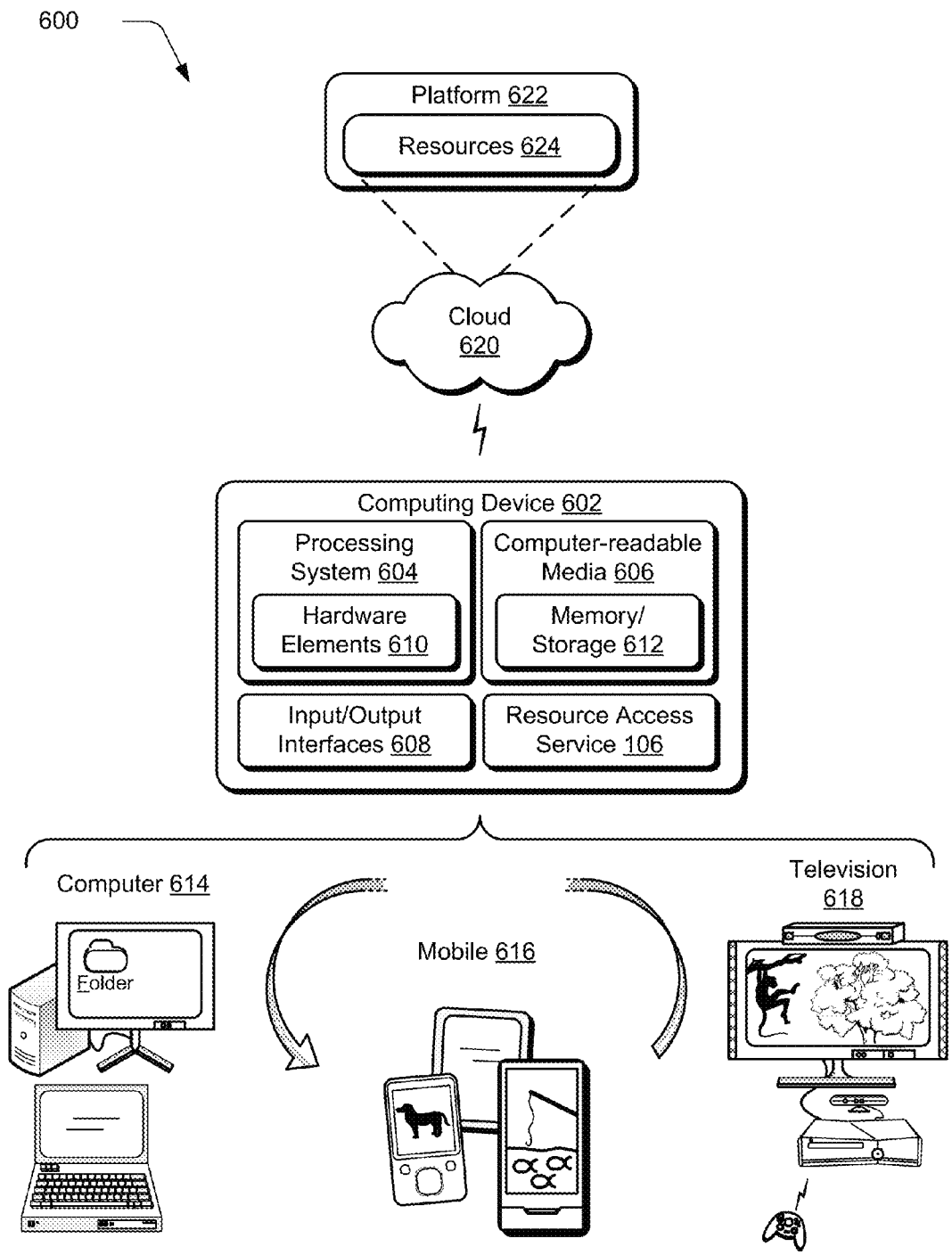
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, one or more of the clients and/or resources discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for implementing spoken and/or voice recognition input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as an module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the resource access service 106 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for resource access throttling are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   receiving a device identifier as part of a request from a device for access to a network resource;
   processing the device identifier to generate a client value, the client value calculated from and having a different value than the device identifier;
   determining whether the client value for the device is within current access throttling settings for the network resource; and
   allowing or disallowing the device to access the network resource based on whether the client value is determined to be within the current access throttling settings, the access throttling settings including a threshold defining a maximum number of devices that are allowed access to the network resource at a particular time.

2. A method as described in claim 1, wherein the device identifier is received in response to an indication that the network resource is in an access throttling mode.

3. A method as described in claim 1, wherein the device identifier comprises a hash of a media access control (MAC) address for the device and at least one other identifier for the device.

4. A method as described in claim 1, further comprising:
   allowing the device access to the network resource in response to determining that the client value is within the current access throttling settings for the network resource; and
   issuing the device an access pass that enables the device to access the network resource as part of at least one subsequent request to access the network resource.

5. A method as described in claim 4, wherein the access pass is configured to at least one of expire after a particular period of time or be revoked by an access service associated with the network resource.

6. A method as described in claim 1, wherein the current access throttling settings includes a threshold number of devices that are permitted to access the network resource at a particular time, and wherein the method further comprises raising the threshold number when a time period elapses after the particular time.

7. A method as described in claim 1, wherein the access throttling settings comprise a set of access throttling settings, the set of access throttling settings being configured to incrementally increase over time the number of requests for access to the network resource that are granted.

8. A system comprising:
   one or more computer-readable storage media storing executable instructions; and
   one or more processors configured to execute the instructions to cause the system to determine whether a device is permitted to access a network resource by performing operations including:

receiving a device identifier as part of a request from the device for access to the network resource;

calculating a client value associated with the device by at least applying one or more algorithms to the device identifier, the client value having a different value than the device identifier; and determining, based on the client value for the device, of whether the device is within a threshold number of devices that are permitted to access the network resource, the threshold defining a maximum number of devices that are allowed access to the network resource at a particular time.

9. A system as described in claim 8, wherein the device identifier is received in response to an indication that the network resource is in an access throttling mode.

10. A system as described in claim 8, wherein the device identifier comprises a hash of a media access control (MAC) address for the device and at least one other identifier for the device.

11. A system as described in claim 8, wherein said determining comprises determining whether the client value is within one or more access throttling settings for the network resource.

12. A system as described in claim 8, wherein the operations further include:

granting the device access to the network resource in response to a determination that the client value is within the threshold number of devices; and issuing the device an access pass that enables the device to access the network resource as part of at least one subsequent request to access the network resource.

13. A system as described in claim 8, wherein the threshold number corresponds to an access throttling setting included as part of a set of access throttling settings, the set of access throttling settings being configured to incrementally increase over time the number of requests for access to the network resource that are granted.

14. A system comprising:

one or more processors; and one or more computer-readable storage devices having instructions stored thereon that are executable by the one or more processors to perform operations including:

receiving a device identifier as part of a request from a device for access to a network resource;

generating a client value for the device by applying one or more algorithms to the device identifier, the client value having a different value than the device identifier; and determining, based on the client value, whether the device is within a threshold number of devices that are permitted to access the network resource, the threshold defining a maximum number of devices that are allowed access to the network resource at a particular time.

15. A system as described in claim 14, wherein the device identifier comprises a hash of a media access control (MAC) address for the device and at least one other identifier for the device.

16. A system as described in claim 14, wherein the operations further comprise:

granting the device access to the network resource in response to determining that the client value is within the threshold number of devices; and issuing the device an access pass that enables the device to access the network resource as part of at least one subsequent request to access the network resource.

17. A system as described in claim 14, wherein the access pass is configured to at least one of expire after a particular period of time or be revoked by an access service associated with the network resource.

18. A system as described in claim 14, wherein the threshold number is set for a particular time, and wherein the method further comprises raising the threshold number when a time period elapses after the particular time.

19. A system as described in claim 14, wherein the threshold number corresponds to an access throttling setting included as part of a set of access throttling settings, the set of access throttling settings being configured to incrementally increase over time the number of requests for access to the network resource that are granted.

20. A method as described in claim 1, wherein processing the device identifier to generate the client value comprises applying a modulo operation to the device identifier with the result of the modulo operation corresponding to the client value.

* * * * *